(12) United States Patent
Purvines

(10) Patent No.: US 7,800,276 B2
(45) Date of Patent: Sep. 21, 2010

(54) ROTOR ASSEMBLY

(75) Inventor: Stephen H. Purvines, Mishiwaka, IN (US)

(73) Assignee: Kurz-Kasch, Inc., Miamisburg, OH (US)

(*) Notice: Subject to any disclaimer, the term of this patent is extended or adjusted under 35 U.S.C. 154(b) by 0 days.

(21) Appl. No.: 11/804,080

(22) Filed: May 17, 2007

(65) Prior Publication Data

US 2008/0284267 A1   Nov. 20, 2008

(51) Int. Cl.
*H02K 1/22* (2006.01)
(52) U.S. Cl. .............. 310/266; 310/43; 310/49.29; 310/49.51; 310/101; 310/156.35; 310/112; 310/114; 310/268; 310/67 R; 310/36; 310/34; 310/156.01; 310/154.33; 310/156.26
(58) Field of Classification Search ......... 310/266–268, 310/154.33, 156.78, 112, 114, 67 R, 156.01, 310/156.34, 156.36, 261, 49.29, 49.51, 101, 310/156.35, 43; *H02K 1/22*
See application file for complete search history.

(56) References Cited

U.S. PATENT DOCUMENTS

| | | | | |
|---|---|---|---|---|
| 2,820,914 | A * | 1/1958 | Rudoff et al. ................. | 310/43 |
| 4,410,820 | A | 10/1983 | Stanley | |
| 4,571,528 | A * | 2/1986 | McGee et al. .......... | 318/400.41 |
| 4,633,149 | A * | 12/1986 | Welterlin ................ | 318/400.41 |
| 4,672,247 | A * | 6/1987 | Madsen et al. ............. | 310/49 R |
| 4,731,554 | A * | 3/1988 | Hall et al. ................. | 310/67 R |
| 4,745,345 | A | 5/1988 | Petersen | |
| 4,837,474 | A | 6/1989 | Petersen et al. | |
| 4,949,000 | A * | 8/1990 | Petersen ...................... | 310/179 |
| 5,117,141 | A * | 5/1992 | Hawsey et al. .............. | 310/114 |
| 5,334,899 | A * | 8/1994 | Skybyk ...................... | 310/268 |
| 5,659,217 | A | 8/1997 | Petersen | |
| 5,721,461 | A * | 2/1998 | Taylor ........................ | 310/268 |
| 5,801,473 | A | 9/1998 | Helwig | |
| 6,037,696 | A * | 3/2000 | Sromin et al. ................ | 310/268 |
| 6,373,162 | B1 * | 4/2002 | Liang et al. ............ | 310/156.53 |
| 6,545,379 | B2 * | 4/2003 | Gomyo ...................... | 310/68 R |
| 6,605,883 | B2 * | 8/2003 | Isozaki et al. ............. | 310/49.42 |
| 6,700,271 | B2 * | 3/2004 | Detela ......................... | 310/164 |
| 6,727,632 | B2 * | 4/2004 | Kusase ....................... | 310/266 |
| 6,750,588 | B1 | 6/2004 | Gabrys | |
| 6,787,965 | B1 * | 9/2004 | Horng et al. ................ | 310/257 |
| 6,841,916 | B2 | 1/2005 | Chiarenza | |
| 6,891,343 | B2 | 5/2005 | Petersen | |
| 6,922,004 | B2 | 7/2005 | Hashimoto et al. | |

(Continued)

FOREIGN PATENT DOCUMENTS

EP   1 628 381 A1   2/2006

OTHER PUBLICATIONS

International Search Report for related PCT Application PCT/US2008/006289, Jan. 21, 2009 (7 pgs).

*Primary Examiner*—Quyen Leung
*Assistant Examiner*—John K Kim
(74) *Attorney, Agent, or Firm*—Stinson Morrison Hecker LLP

(57) ABSTRACT

Devices and methods are provided for a rotor assembly and an electric motor. One embodiment for a rotor assembly includes a first rotor including a first interface surface and a second rotor including a second interface surface corresponding to the first interface surface. Also, the first rotor is positioned with the first interface surface in direct physical contact with the second interface surface of the second rotor.

20 Claims, 8 Drawing Sheets

U.S. PATENT DOCUMENTS

| | | | |
|---|---|---|---|
| 7,019,429 B1 * | 3/2006 | Larsson et al. | 310/215 |
| 7,034,422 B2 | 4/2006 | Ramu | |
| 7,119,468 B2 * | 10/2006 | Shkondin | 310/114 |
| 2004/0061396 A1 * | 4/2004 | Narita et al. | 310/112 |
| 2004/0245878 A1 * | 12/2004 | Kim et al. | 310/114 |
| 2004/0251759 A1 | 12/2004 | Hirzel | |
| 2005/0212381 A1 * | 9/2005 | Gilmour et al. | 310/266 |
| 2005/0285474 A1 * | 12/2005 | Kaneko | 310/266 |
| 2006/0028081 A1 * | 2/2006 | Minagawa | 310/156.36 |
| 2006/0061227 A1 * | 3/2006 | Heideman et al. | 310/156.56 |
| 2006/0066173 A1 | 3/2006 | Kim et al. | |
| 2006/0244338 A1 * | 11/2006 | Petersen | 310/266 |
| 2007/0205682 A1 * | 9/2007 | Choi et al. | 310/114 |

* cited by examiner

ROTOR ASSEMBLY

INTRODUCTION

Electrical motors include a stator and a rotor to convert electrical energy into a magnetic interaction that causes the rotor to turn. One aspect of creating this magnetic interaction is found in the stator coils. Each stator coil includes windings of conductive wire. When a potential is applied through the stator coils an electromagnetic field can be generated. In addition to the electromagnetic field, heat can also be generated due to the electrical resistance of the conductive wire. The more efficiently this heat can be dissipated, the more efficiently the motor can run.

BRIEF DESCRIPTION OF THE DRAWINGS

The Figures presented herein provide illustrations of non-limiting example embodiments of the present disclosure. The Figures are not necessarily to scale.

DETAILED DESCRIPTION

Figure 1:
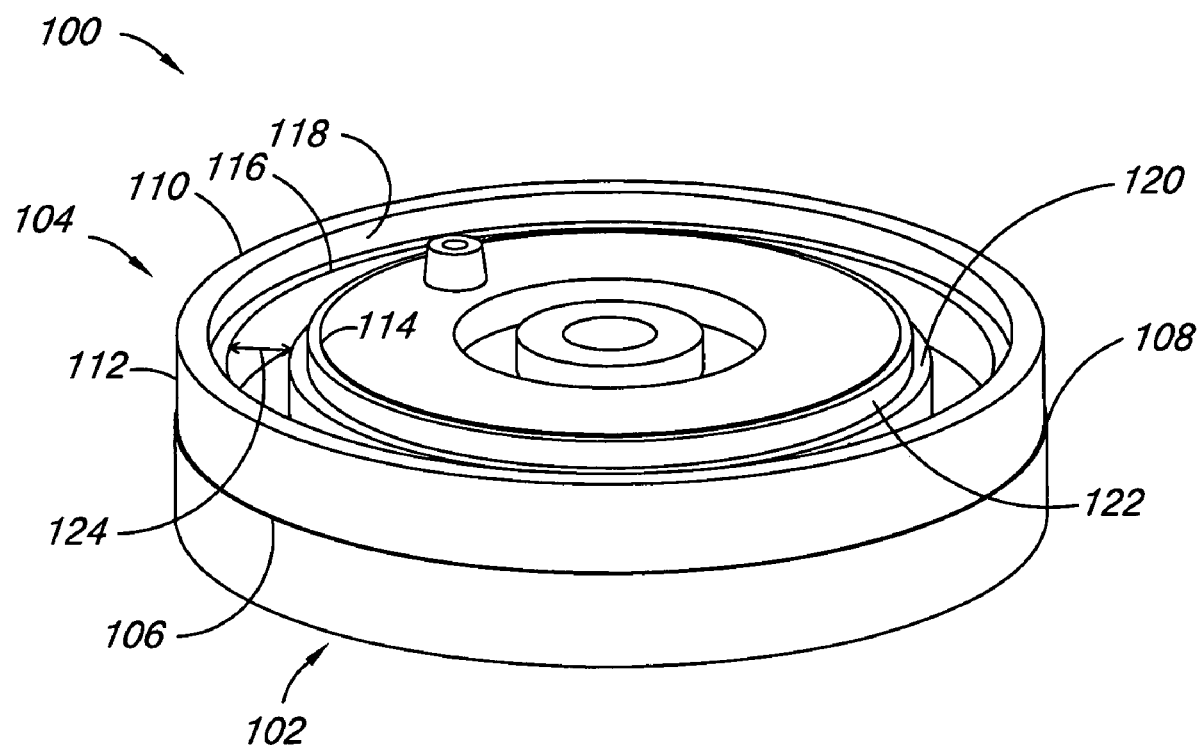
FIG. 1 provides an illustration of one embodiment of a rotor assembly according to the present disclosure.

Embodiments of the present disclosure include rotor assemblies, electric motors, and methods of manufacturing the rotor assemblies and electric motors. It will be apparent to those skilled in the art that the following description of the various embodiments of this disclosure are provided for illustration only and not for the purpose of limiting the disclosure as defined by the appended claims and their equivalents.

As will be described herein, an electric motor includes, among other things, a stator assembly and a rotor assembly mounted to a shaft. In the embodiments described in the present disclosure, the stator assembly can include a first stator and a second stator that are positioned in a mirror image configuration to at least partially surround the rotor assembly. The embodiments also provide that the rotor assembly can include a first rotor and a second rotor that are configured to be in physical contact with each other within the stator assembly. In one embodiment, placing the first and second rotors in physical contact with each other, as will be discussed more fully herein, provides for enhanced heat transfer, which can result in a more efficient electric motor.

In the embodiments described in the present disclosure, the first and second stator and the first and second rotor can be over-molded with a thermoset material. As used herein, a thermoset material includes those polymeric materials that once shaped by heat and pressure so as to form a cross-linked polymeric matrix are incapable of being reprocessed by further application of heat and pressure.

Embodiments of the present disclosure include, but are not limited to, a rotor assembly that includes a first rotor including a first interface surface and a second rotor including a second interface surface corresponding to the first interface surface. In addition, the first rotor is positioned with the first interface surface in direct physical contact with the second interface surface of the second rotor.

Embodiments of the present disclosure can also include an electric motor including a housing defining an interior space, an annular stator assembly in the interior space of the housing, where the annular stator assembly includes, among other things, stator sections having field windings with at least one terminal, and a lead frame for electrically coupling each terminal. The electric motor also includes a rotor assembly rotatably coupled within the interior space of the housing and the annular stator assembly. The rotor assembly includes a first rotor including a first interface surface and a second rotor including a second interface surface corresponding to the first interface surface, the first rotor positioned with the first interface surface directly opposite the second interface surface of the second rotor.

The Figures herein follow a numbering convention in which the first digit or digits correspond to the drawing figure number and the remaining digits identify an element in the drawing. Similar elements between different figures may be identified by the use of similar digits. For example, 102 may reference element "102" in FIG. 1, and a similar element may be referenced as "202" in FIG. 2. As will be appreciated, elements shown in the various embodiments herein can be added, exchanged, and/or eliminated so as to provide a number of additional embodiments. The elements and/or embodiments illustrated in the figures are not to scale.

FIG. 1 provides an illustration of one embodiment of a rotor assembly 100 according to the present disclosure. FIG. 1 is an illustration of a perspective view of a rotor assembly 100. The rotor assembly 100 includes a first rotor 102 and a second rotor 104. The first rotor 102 includes a first interface surface 106 and the second rotor 104 includes a second interface surface 108 corresponding to the first interface surface 106. The first rotor 102 can be positioned with the first interface surface 106 in direct physical contact with the second interface surface 108 of the second rotor 104.

In some embodiments, the first rotor 102 can be positioned with the first interface surface 106 directly opposite the second interface surface 108 of the second rotor 104. In such embodiments, the first rotor 102 and second rotor 104 can be directly opposite each other, however, the first rotor 102 and second rotor 104 can be separated, for example, by a coupling plate, a space, or a portion of an over-molded body, as discussed herein.

As discussed herein, the first rotor 102 can be positioned with the first interface surface 106 in direct physical contact with the second interface surface 108 of the second rotor 104. In some embodiments, the first interface surface 106 can be entirely in contact with the second interface surface 108. As used herein, "entirely in contact" is meant to describe when the first interface surface 106 is in direct physical contact with the second interface surface 108 where the edges of the first and second rotor 102, 104 are aligned and no predefined spaces exist between the first interface surface 106 and second interface surface 108.

In some embodiments, the first rotor 102 and the second rotor 104 can include a back iron 110. The back iron 110 can have an annular U-shape including a first wall 112 parallel to a second wall 114. Other shapes for the back iron 110 are also possible. In various embodiments, the back iron 110 can be formed of a ferromagnetic material, for example, steel. As used herein, a "back iron" refers to a physical structure (as well as the materials giving rise to that physical structure) that can be used to complete an otherwise open magnetic circuit.

Back iron 110 structures can be used to transfer magnetic flux from one magnetic circuit element to another, such as either from one magnetically permeable field pole to another, or from a magnet pole of a permanent magnet to a magnet pole of another permanent magnet, or both.

The first and second rotors 102, 104 can also each include a first annular magnet 116 coupled to an interior surface 118 of the first wall 112 of the back iron 110 and a second annular magnet 120 coupled to an interior surface 122 of the second wall 114 of the back iron 110. In some embodiments, the back iron 110 can be formed so that the first and second annular magnets 116, 120 are a predetermined distance 124 apart.

In some embodiments, the first and second annular magnets 116, 120 can be formed of, for example, samarium-cobalt or neodymium alloys, among other materials. In addition, the first annular magnet 116 and the second annular magnet 120 can be formed of a series of magnets with successive opposite polarities. For example, the first annular magnet 116 can include a series of magnets with polarities of North, South, North, . . . etc. while the second annular magnet 120 can include a series of magnets with polarities of South, North, South, . . . etc. In this example, the first and second annular magnets 116, 120 can be arranged so that a North polarity on the first annular magnet 116 corresponds to a South polarity on the second annular magnet 120.

Figure 2:
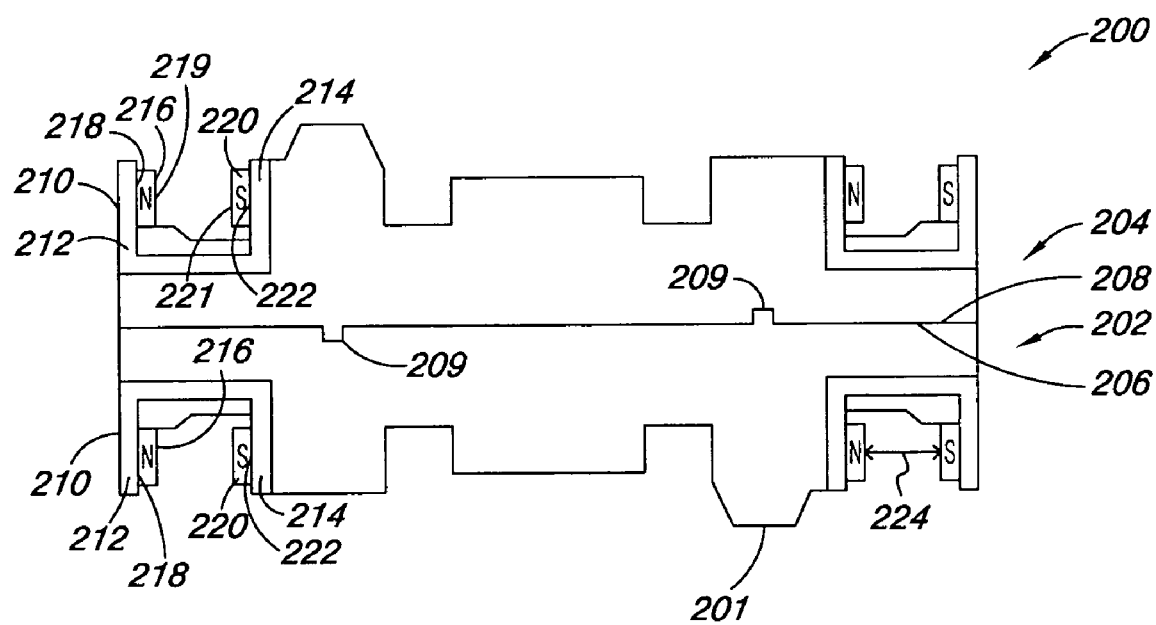
FIG. 2 provides an illustration of one embodiment of a rotor assembly according to the present disclosure.

FIG. 2 provides an illustration of a cross-sectional view of one embodiment of a rotor assembly 200 including an over-molded body 201. As discussed herein, the rotor assembly 200 includes a first rotor 202 and a second rotor 204. The first rotor 202 includes a first interface surface 206 and the second rotor 204 includes a second interface surface 208 corresponding to the first interface surface 206. The first rotor 202 can be positioned with the first interface surface 206 in direct physical contact with the second interface surface 208 of the second rotor 204.

In some embodiments, the first interface surface 206 and the second interface surface 208 can include alignment structures 209 that register when the first interface surface 206 and the second interface surface 208 are in direct physical contact. In some embodiments, the alignment structures 209 can be a pin on one interface surface with an accompanying socket on the other interface surface. For example, the alignment structure 209 on the first rotor 202 can be a pin, and the counterpart alignment structure 209 on the second rotor 204 can be a socket to fit the pin. Other alignment structure 209 configurations are also possible, for example, the alignment structures 209 can be an annular ridge on one interface surface with a corresponding annular groove on the other interface surface.

In addition, as illustrated in FIG. 2, a portion of the rotor assembly 200 can include an over-molded body 201. In some embodiments, the first rotor 202 and the second rotor 204 can be over-molded separately and then over-molded again to form the rotor assembly 200. The separately over-molded first rotor 202 and the second rotor 204 can be coupled together mechanically using a fastener (e.g., screws, nails, tacks, etc.) or through the use of an adhesive. Alternatively, the first and second rotors 202, 204 can be over-molded together to form the rotor assembly 200 as illustrated.

Additionally, in some embodiments, the first and second rotors 202, 204 can be over-molded such that the first annular magnet 216 and the second annular magnet 220 extend from the over-molded body 201. Alternatively, in various embodiments, the first and second annular magnets 216, 220 can be partially covered by the over-molded body 201 while an interior surface 219 of the first annular magnet 216 and an interior surface 221 of the second annular magnet 220 are left exposed.

In some embodiments, the over-molding material can be a thermoset material. As discussed herein, a thermoset material includes those polymeric materials that once shaped by heat and pressure so as to form a cross-linked polymeric matrix are incapable of being reprocessed by further application of heat and pressure. As provided herein, thermoset materials can be formed from the polymerization and cross-linking of a thermoset precursor. Such thermoset precursors can include one or more liquid resin thermoset precursors.

In the embodiments described herein, the liquid resin thermoset precursor can be selected from an unsaturated polyester, a polyurethane, an epoxy, an epoxy vinyl ester, a phenolic, a silicone, an alkyd, an allylic, a vinyl ester, a furan, a polyimide, a cyanate ester, a bismaleimide, a polybutadiene, and a polyetheramide. As will be appreciated, the thermoset precursor can be formed into the thermoset material by a polymerization reaction initiated by heat, pressure, catalysts, and/or ultraviolet light.

As will be appreciated, the thermoset material used in the embodiments of the present disclosure can include non-electrically conducting reinforcement materials and/or additives such as non-electrically conductive fillers, fibers, curing agents, inhibitors, catalysts, and toughening agents (e.g., elastomers), among others, to achieve a desirable combination of physical, mechanical, and/or thermal properties.

Non-electrically conductive reinforcement materials can include woven and/or nonwoven fibrous materials, particulate materials, and high strength dielectric materials. Examples of non-electrically conductive reinforcement materials can include, but are not limited to, glass fibers, including glass fiber variants, synthetic fibers, natural fibers, and ceramic fibers.

Non-electrically conductive fillers include materials added to the matrix of the thermoset material to alter its physical, mechanical, thermal, or electrical properties. Such fillers can include, but are not limited to, non-electrically conductive organic and inorganic materials, clays, silicates, mica, talcs, asbestos, rubbers, fines, and paper, among others.

In an additional embodiment, the liquid resin thermoset precursor can include a polymerizable material sold under the trade designator "Luxolene" from the Kurz-Kasch Company of Dayton, Ohio.

Figure 3A:
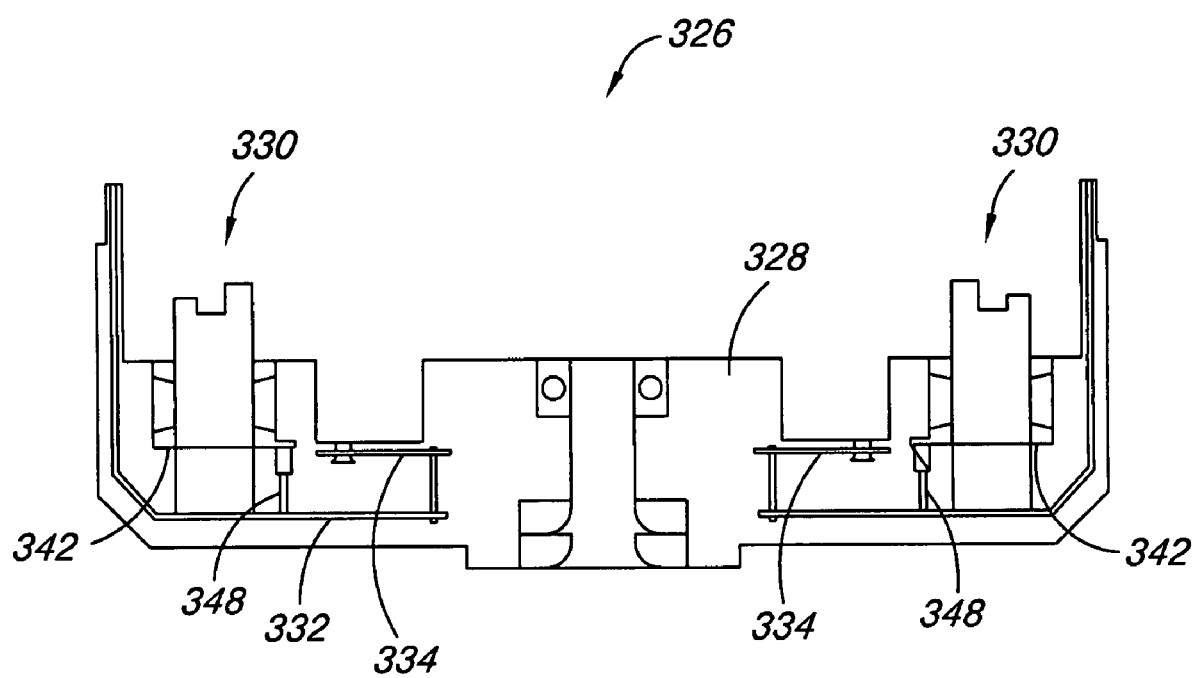
FIGS. 3A-3C provide an illustration of one embodiment of a stator according to the present disclosure.
Figure 3B:
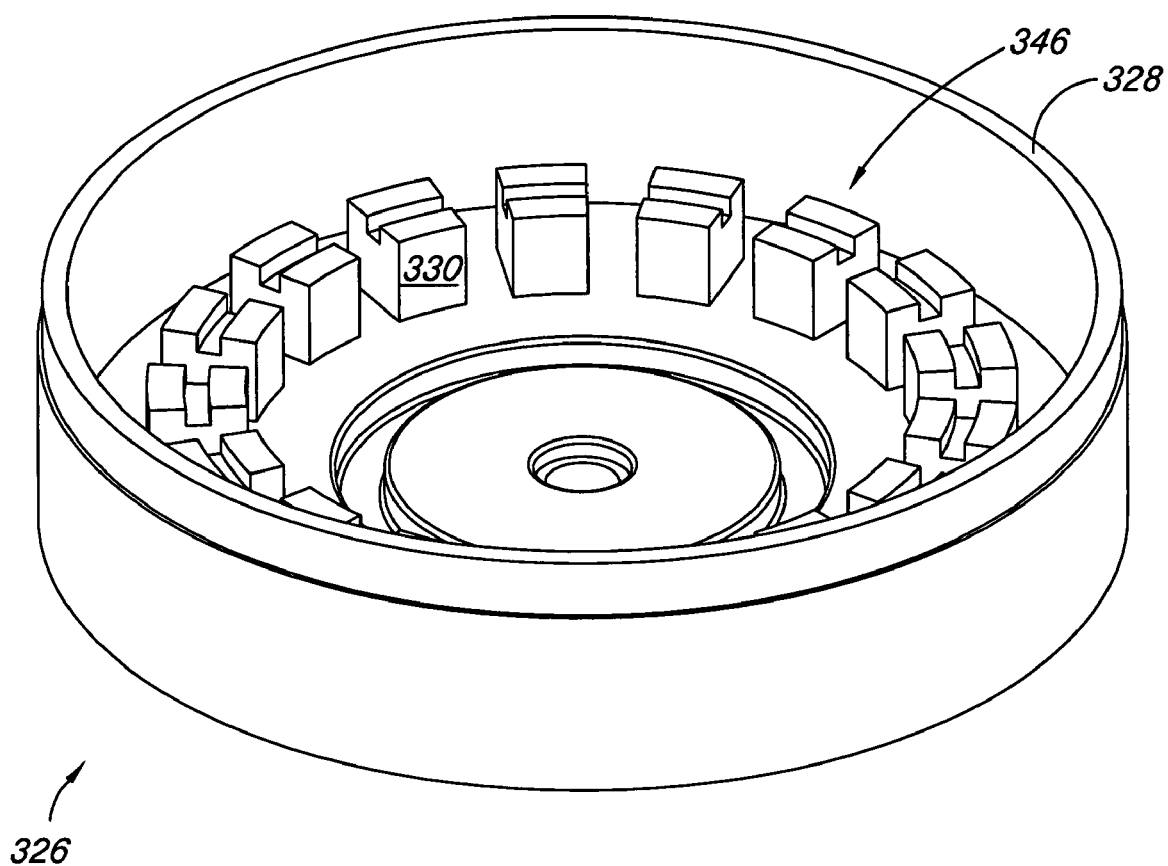
Figure 3C:
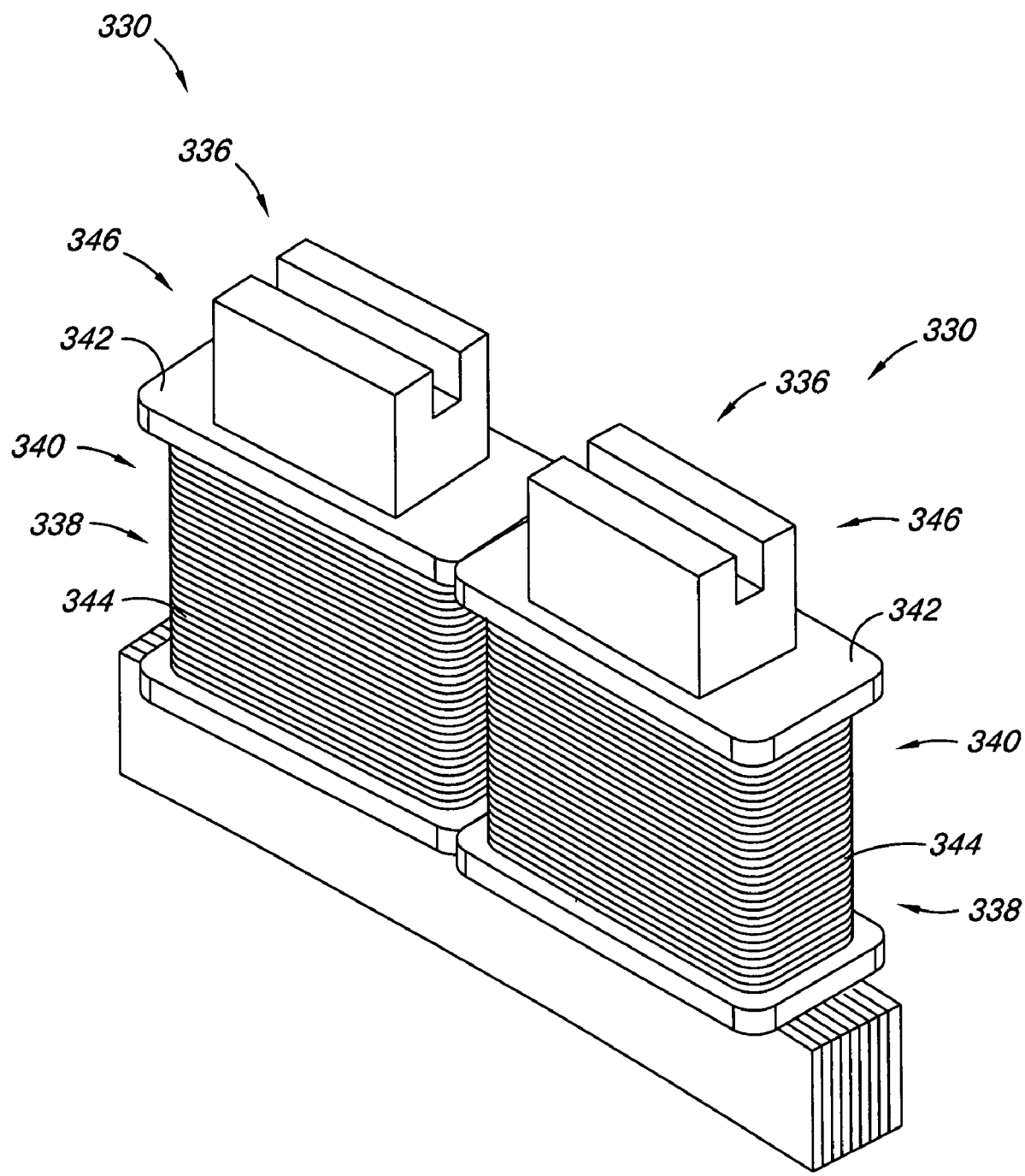

FIGS. 3A-3C provide an illustration of one embodiment of a stator 326 according to the present disclosure. FIG. 3A illustrates a cross-sectional view of a stator 326 with an over-molded stator housing 328, FIG. 3B illustrates a perspective view of a stator 326 with an over-molded stator housing 328, and FIG. 3C illustrates a stator section 330, as discussed herein. As illustrated in FIG. 3A, the stator 326 can include a lead frame 332, a printed circuit (PC) board 334 connected to the lead frame 332, and a number of annularly arranged stator sections 330.

FIG. 3C illustrates an embodiment of two stator sections 330. In some embodiments, the stator section 330 can be formed having a core component 336 formed of, for example, a soft magnetic composite (SMC). As used herein, an SMC is an insulation coated ferrous powder metal material that can be molded into a shape using a high pressure compaction process. Alternatively, in some embodiments, the core component 336 can be formed of stacked metal laminations formed of, for example, iron and/or other metal or metal-alloys that can provide a magnetic field (e.g., cobalt, nickel, alloys thereof).

As illustrated, each stator section 330 can have two portions, a winding association region 338 and a pole piece region 346. In some embodiments, a stator winding assembly 340 and a bobbin 342 are positioned over the winding association region 338. In some embodiments, the bobbin 342 can be formed of a non-conducting material about which are provided field windings 344. The field windings 344, when excited, can interact to generate electromagnetic flux within the core component 336.

Above each winding association region 338, each stator section 330 can also include the pole piece region 346. In some embodiments, the pole piece region 346 can extend above the windings 344 an amount representing about one-half or less of the height of the windings of their associated winding association region 338. In some embodiments, the distance between the pole piece regions 346 is selected such that the electromagnetic flux path is between adjacent stator poles. This can be achieved by making the distance between the pole piece regions 346 a value representing a path with the least impedance to the flow of electromagnetic flux with respect to other paths which might be available.

As illustrated in FIG. 3A, the lead frame 332 can be connected to the stator section 330 via a terminal 348 on the bottom surface of the bobbin 342. In some embodiments, the lead frame 300 can be connected to the terminals 348 by soldering, welding, or a plug connection. In such embodiments, the lead frame 332 can have an annular configuration to connect to each stator section 330 arranged in a circular pattern. Embodiments of the present disclosure are not limited to annular lead frames 332. In some embodiments, more than one lead frame 332 can be used to connect to each stator section 330 separately. Other configurations for the lead frame 332 are also possible, including a half-circle shape, among others.

As illustrated in FIGS. 3A and 3B, the stator 326 can be over-molded to form a stator housing 328. In such embodiments, the over-molded stator housing 328 can be formed such that the over-mold material encapsulates the winding association region 338 of the stator sections 330, the terminals 348 connecting the stator sections 330 to the lead frame 332, the lead frame 332, and the PC board 334, while leaving the pole piece region 346 of each stator section 330 exposed. In some embodiments, the over-molded stator housing 328 can be formed of a thermoset material, as discussed herein.

The over-molded stator housing 328 can restrain the internal components of the stator 326 to permit the internal components to withstand a higher vibration and shock load than the internal components could withstand without the over-molded stator housing 328. Therefore, by providing an over-molded stator housing 328, the displacement of unrestrained internal components can be prevented, which can cause high point stresses and premature failure.

In some embodiments, the stator 326 can be over-molded with a thermoset material, as discussed herein. As will be appreciated, the stator 326 can be placed within a molding tool and the thermoset material can be supplied to the molding tool to encapsulate at least a portion of the stator 326.

Providing the thermoset material can include injecting a thermoset precursor (e.g., low-viscosity thermoset precursor) and catalyst (optional) into the molding under low pressure to fill the mold cavity volume such that the thermoset material encapsulates at least a portion of the stator 326. Since the thermoset precursor can include a low viscosity, the thermoset precursor can substantially fill spaces defined by various surfaces of the stator components, including the lead frame 332, terminals 348, and PC board 334, among others including spaces within slots and grooves, and spaces between stator sections 330 and the field windings 344. Heat and pressure can then be applied to cure the thermoset precursor to form the over-molded stator housing 328. A post cure process can also be used. After curing, the over-molded stator housing 328 can be removed from a molding tool.

Encapsulating at least a portion of the stator 326 within a thermoset material can provide for improved heat transfer characteristics. For example, the thermoset material encasing the field windings 344 serves to efficiently conduct heat away from the windings 344 and also to fill the gaps between the windings 344. In addition, the various portions of the stator 326 can be tightly secured together by complete encapsulation. For example, the capsule serves to secure the field windings 344 to the stator sections 330 to prevent movement of the windings 344. The thermoset material also serves to secure the stator sections 330 to each other to help prevent the movement of the stator sections 330 with respect to each other.

Methods and processes for forming the various components of the stator 326 described herein are provided as non-limiting examples of the present disclosure. As will be appreciated, a variety of molding processes exist that can be used to form the stator components. Examples of such molding processes can include resin transfer molding, compression molding, transfer molding, and injection molding, among others.

Embodiments of the stator 326 components can also be formed from a number of different materials. For example, the bobbin 342 can be formed of, by way of illustration and not by limitation, thermoset polymers, as discussed herein, and/or thermoplastic polymers.

Examples of thermoplastic polymers include polyolefins such as polyethylene and polypropylene, polyesters such as Dacron, polyethylene terephthalate and polybutylene terephthalate, vinyl halide polymers such as polyvinyl chloride (PVC), polyvinylacetate such as ethyl vinyl acetate (EVA), polyurethanes, polymethylmethacrylate, pellethane, polyamides such as nylon 4, nylon 6, nylon 66, nylon 610, nylon 11, nylon 12 and polycaprolactam, polyaramids (e.g., KEVLAR), segmented poly(carbonate-urethane), Rayon, fluoropolymers such as polytetrafluoroethylene (PTFE or TFE) or expanded polytetrafluoroethylene (ePTFE), ethylene-chlorofluoroethylene (ECTFE), fluorinated ethylene propylene (FEP), polychlorotrifluoroethylene (PCTFE), polyvinylfluoride (PVF), or polyvinylidenefluoride (PVDF).

In one embodiment, the bobbin 342 can be formed through an injection molding process. For example, a single mold can be configured to provide for the shape of the bobbin 342. The thermoplastic material, or thermoset material, can be injected into the mold to form the bobbin 342. In alternative embodiment, the bobbin 342 could be formed in a casting process or stamping. In alternative embodiment, segments of the bobbin 342 can be individually formed and then coupled together to form the bobbin 342. Examples of suitable techniques for coupling the individual segments include use of chemical adhesives and/or thermal energy to weld the individual segments together.

Figure 4:
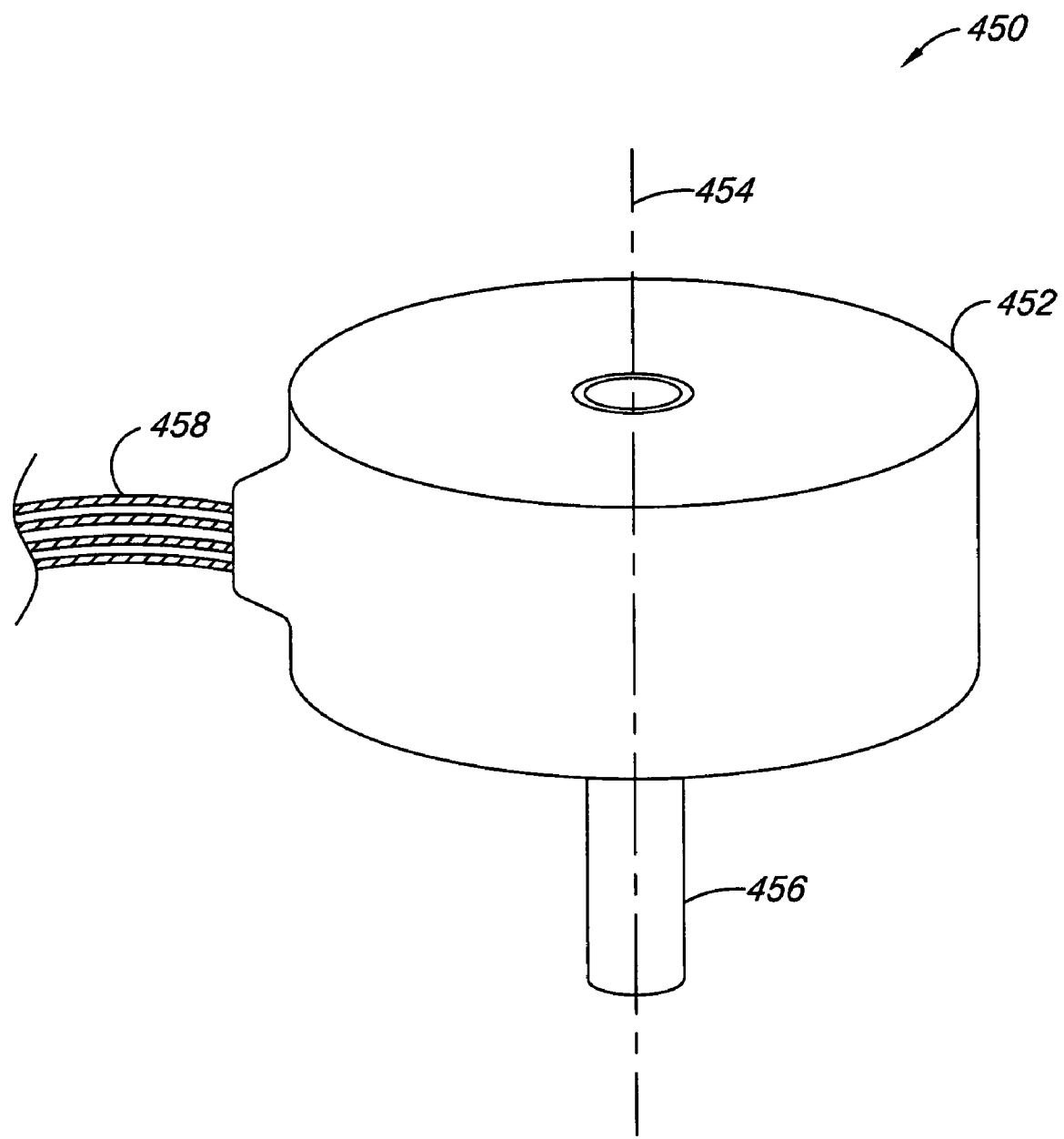
FIG. 4 provides an illustration of a perspective view of an electric motor according to the present disclosure.

FIG. 4 provides an illustration of a perspective view of an electric motor 450 according to the present disclosure. The electric motor 450 can be configured having a cylindrically shaped housing 452. Other shapes are also possible including square, rectangular, spherical, and/or elliptical. In addition, the housing 452 can include an interior space for a stator assembly including a first and second stator, and a rotor assembly including a first and second rotor, as discussed herein. The first and second rotor can be driven in rotation about an axis 454 of the motor 450 and can function to drive a motor shaft 456 coaxially disposed with axis 454 that is supported at a bearing structure mounted within the housing 452. In some embodiments, the housing 452 can include additional stator assemblies and rotor assemblies, as discussed herein.

In some embodiments, the motor 450 can include one or more cables 458 extending from the side of the housing 452 to carry a current to the motor 450. The housing 452 can be formed of a thermoset material, as discussed herein, or other plastic materials that can withstand the heat generated by the motor 450.

Figure 5:
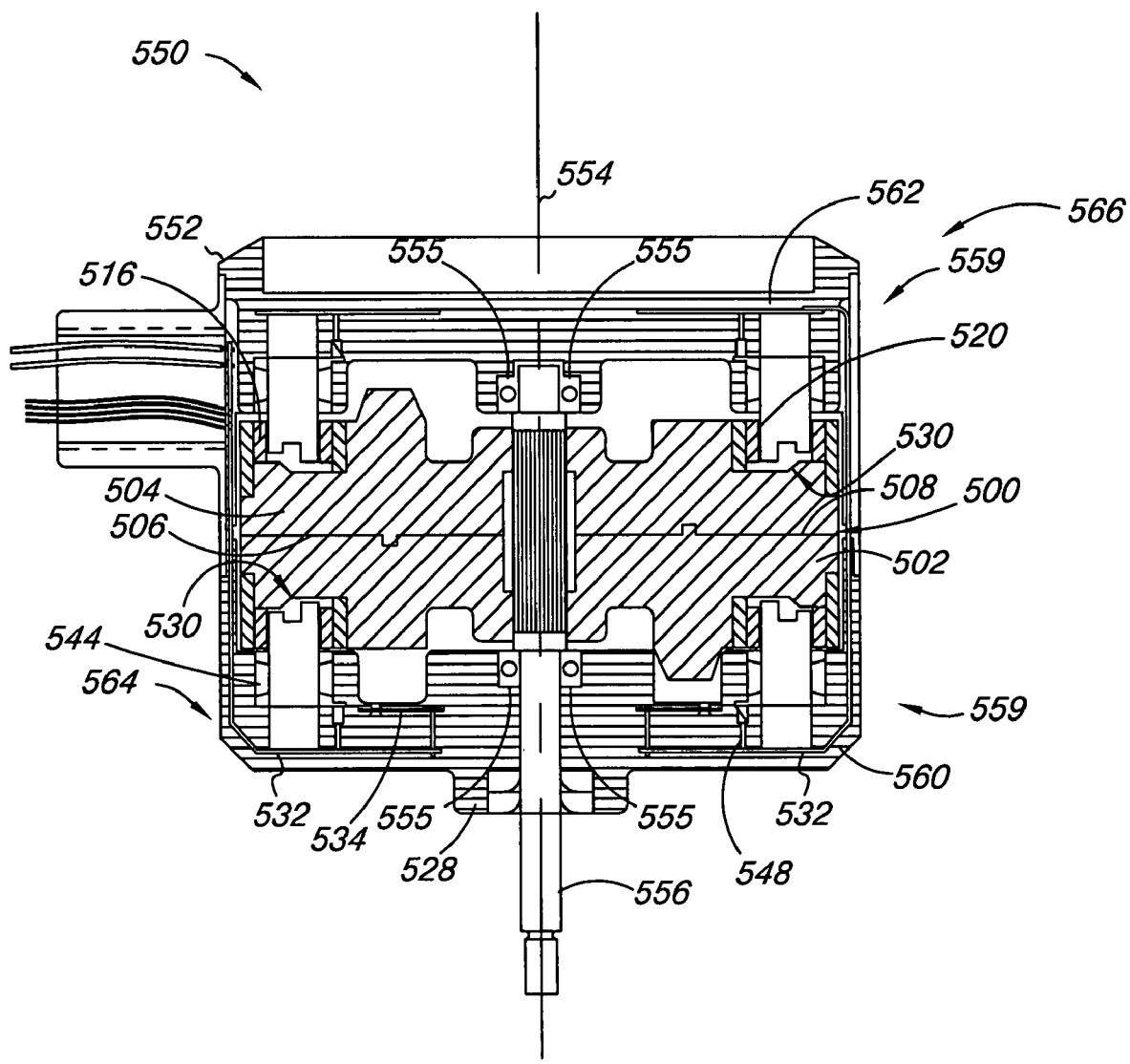
FIG. 5 illustrates a plan view of an embodiment of the internal structure of an electric motor according to the present disclosure.

FIG. 5 illustrates a plan view of an embodiment of the internal structure of an electric motor 550 according to the present disclosure. In some embodiments, the electric motor 550 can include a rotor assembly 500, as discussed herein, coupled to a motor shaft 556. The rotor assembly 500 can rotate with the motor shaft 556 about a motor axis 554. The motor shaft 556 is illustrated to be aligned along axis 554 and is supported upon a stator by a bearing structure 555. The motor shaft 556 can also be coupled into and support the rotor assembly 500.

As discussed herein, the rotor assembly 500 can include a first rotor 502 with a first interface surface 506 and a second rotor 504 including a second interface surface 508 corresponding to the first interface surface 506. The first rotor 502 can be positioned with the first interface surface 506 in direct physical contact with the second interface surface 508 of the second rotor 504.

As discussed herein, the electric motor 550 can also include a stator. In some embodiments, the electric motor 550 can include an annular stator assembly 559 including stator sections 530 having field windings 544 with at least one terminal 548. The annular stator assembly 559 can include a first stator 560 and a second stator 562 fixedly arranged within the motor housing 552, as described herein. In addition, the first stator 560 and second stator 562 can include a lead frame 532, a PC board 534, stator sections 530, and an over-molded stator housing 528, as described herein.

The first stator 560 can be positioned in the motor housing 552 in a lower portion 564 of the motor housing 552 relative an upper portion 566 of the motor housing 552. In addition, the first stator 560 and the second stator 562 can be positioned around the rotor assembly 500 such that the second stator 562 is a mirror image of the first stator 560. In such embodiments, the first stator 560 and the second stator 562 can form a housing for the rotor assembly 500.

As discussed herein, in some embodiments, a portion of the first stator 560 and second stator 562 can be over-molded to form an over-molded stator housing 528. The over-molded stator housing 528 on the first and second stators 560, 562 can be formed to include an interfacing edge where the interfacing edge of each stator is in direct physical contact. In such embodiments, the first and second stators 560, 562 can be over-molded together or coupled (e.g., using a chemical adhesive) to form a stator structure that completely surrounds (i.e., houses) the rotor assembly 500.

In some embodiments, the first stator 560 can be positioned in the motor housing 552 such that the annularly arranged stator sections 530 are between the first annular magnet 516 and the second annular magnet 520 of the first rotor 502. Similarly, the second stator 562 can be positioned in the motor housing 552 such that the annularly arranged stator sections 530 are between the first annular magnet 516 and the second annular magnet 520 of the second rotor 504.

As illustrated, in some embodiments, the PC board 534 can be connected to the lead frame 532 via a terminal 548. The PC board 534 may acquire data as to the instantaneous rotational position of the first and second rotors 502, 504. The information can be supplied, for example, using selectively magnetized magnetic material located within a rotor position ring fixed to the underside of the first rotor 502. The ring magnet can be magnetized in sectors corresponding with a magnetization component of the first and second annular magnets 516, 520 on either the first rotor 502 and/or the second rotor 504. In some embodiments, the PC board 534 can also include one or more Hall effect devices.

In some embodiments, the lead frame 532 of the first stator 560 can be configured to extend from the lower portion 564 of the motor housing 552 to the upper portion 566 of the motor housing 552, providing a direct thermal transfer path from the PC board 534 to an exterior surface of the motor housing 552.

As will be appreciated, embodiments of the first and second stators 560, 562 and the rotor assembly 500 of the present disclosure can be utilized in a variety of motor configurations. For example, suitable motor configurations can include motors that operate on alternating current (AC) (i.e., induction or synchronous AC motor, switched reluctance motor) and/or direct current (DC) (e.g., a universal motor or a DC motor). As understood, AC motors can be configured as a single-phase, split-phase, poly-phase, or a three-phase motor. Furthermore, it will be apparent to those skilled in the art from this disclosure that although the embodiments of the present disclosure can be used with an electric motor, embodiments of the present disclosure can be used with other rotary type electric machines such as a generator or motor/generator.

In addition to the configuration shown in FIG. 5 using a stator assembly 559 including a first stator 560 and a second stator 562 and a rotor assembly 500 including a first rotor 502 and second rotor 504, the electric motor 550 can also be configured to include a first stator 560 and a first rotor 502. In this embodiment, the first stator 560 and first rotor 502 can be positioned as illustrated in FIG. 5, however, the electric motor 550 would end at the first interface surface 506. In addition, in this embodiment, the electric motor 550 would produce less (e.g. approximately one-half) power as the electric motor 550 illustrated in FIG. 5.

Figure 6:
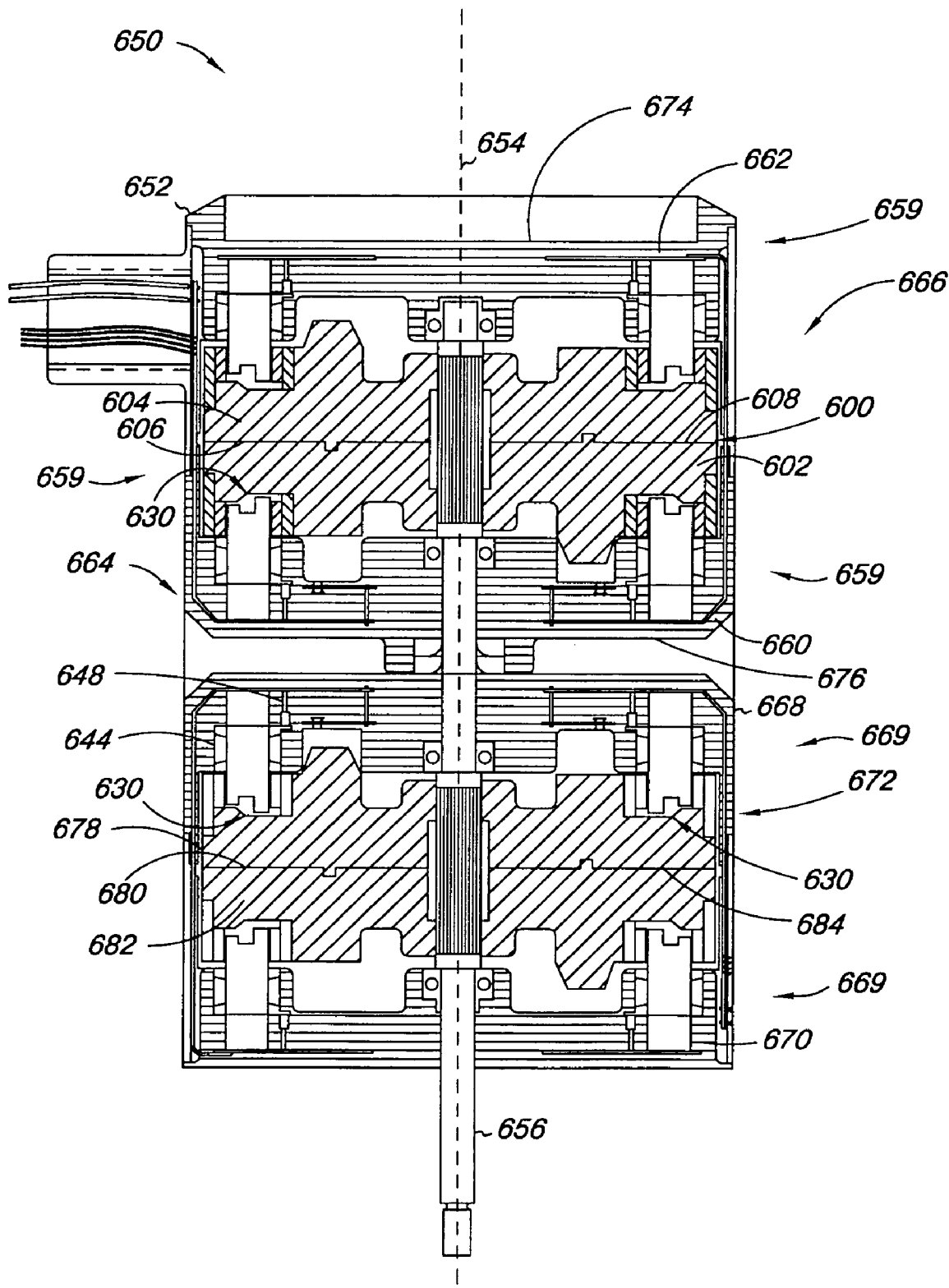
FIG. 6 illustrates a plan view of an embodiment of the internal structure of an electric motor according to the present disclosure.

FIG. 6 illustrates a plan view of an embodiment of the internal structure of an electric motor 650 according to the present disclosure. As illustrated, an annular stator assembly 659 can include a first stator 660 and a second stator 662 positioned in a mirror image relationship around the rotor assembly 600. The stator assembly 659 can include a top surface 674 and a bottom surface 676.

In some embodiments, the motor housing 652 can include a second stator assembly 669 including a third stator 668. The third stator 668 can include stator sections 630 having field windings 644 with at least one terminal 648. The third stator 668 can be positioned in a corresponding direction to the second stator 662 opposite the bottom surface 676 of the annular stator assembly 659. As used herein, a "corresponding direction" refers to a similar position of one object with respect to another object. For example, the second stator 662 is positioned at the top of the annular stator assembly 659 with the stator section 630 in a downward direction facing the rotor assembly 600. Similarly, the third stator 668 is positioned at the top of the second annular stator assembly 669 with the stator section 630 in a downward direction facing a second rotor assembly 672. The motor housing 652 can also include a third rotor 678 including a third interface surface 680, where the third rotor 678 is positioned in a corresponding direction to the second rotor 604 inside the annular stator assembly 659.

The electric motor 650 can further include a fourth stator 670 in a mirror image relationship with the third stator 668 and a fourth rotor 682 with a fourth interface surface 684 directly opposite the third interface surface 680 of the third rotor 678. The third and fourth stators 668, 670 can be fixedly arranged around a second rotor assembly 672, including the third and fourth rotors 678, 682, as discussed herein. By including a third and fourth stator 668, 670 and a second rotor assembly 672, the electric motor 650 can have approximately double the power output as the electric motor illustrated in FIG. 4.

In addition, embodiments of the present disclosure are not limited to doubling the power output by adding a third and fourth stator 668, 670 and a second rotor assembly 672. Instead, an electric motor of the present disclosure can also include a fifth and sixth stator and a third rotor assembly, and so on.

As electric motor size increases, more heat can be generated due to, for example, increased load and current demand, causing an attendant temperature rise. The increased temperature can increase the impedance of the field windings, which, in turn, can diminish the power generating capability of the electric motor.

By arranging the rotor assembly so that a first rotor and a second rotor interact with a first stator and a second stator on opposite sides, heat generated by the stator coils can be carried to the exterior of the electric motor through each stator lead frame, as discussed herein. Then, when another stator-rotor assembly-stator is added, as illustrated in FIG. 6, generated heat can be carried to the exterior of the electric motor in the same way, at each stator. In this way, an electric motor of the present disclosure with several stacks of stator-rotor assembly-stator embodiments, as described herein, will not suffer as much from poor heat dissipation as the electric motor size increases.

While the present disclosure has been shown and described in detail above, it will be clear to the person skilled in the art that changes and modifications may be made without departing from the spirit and scope of the disclosure. As such, that which is set forth in the foregoing description and accompanying drawings is offered by way of illustration only and not as a limitation. The actual scope of the disclosure is intended to be defined by the following claims, along with the full range of equivalents to which such claims are entitled.

In addition, one of ordinary skill in the art will appreciate upon reading and understanding this disclosure that other variations for the disclosure described herein can be included within the scope of the present disclosure.

What is claimed:

1. A rotor assembly, comprising:
    a first rotor including a first interface surface extending from edge to edge of the first rotor; and
    a second rotor including a second interface surface corresponding to the first interface surface and extending from edge to edge of the second rotor, the first rotor positioned with the first interface surface in direct physical contact with the second interface surface where the edges of the first and second rotors are aligned;
    where the first and the second rotor each include:
        an over-molded body of a thermoset material including non-electrically conducting reinforcement materials;
        an annular U-shaped back iron including a first wall parallel to a second wall;
        a first annular magnet coupled to an interior surface of the first wall; and
        a second annular magnet coupled to an interior surface of the second wall, the first and second annular magnets formed of a series of magnets with successive opposite polarities, and extending from the over-molded body.

2. The rotor assembly of claim 1, where the non-electrically conducting reinforcement materials are selected from the group of materials including woven fibrous materials, non-woven fibrous materials, particulate materials, and high strength dielectric materials.

3. The rotor assembly of claim 1, where the first annular magnet and the second annular magnet are arranged so that polarities on the first annular magnet align with opposite polarities on the second annular magnet.

4. The rotor assembly of claim 1, where the first and second rotors are over-molded together.

5. The rotor assembly of claim 4, where at least a portion of the first annular magnet and the second annular magnet extend from the over-molded body.

6. The rotor assembly of claim 1, where the first interface surface and the second interface surface include alignment structures that register when the first interface surface is in direct physical contact with the second interface surface.

7. The rotor assembly of claim 1, where the non-electrically conducting reinforcement materials are selected from the group of reinforcement materials including glass fibers, glass fiber variants, synthetic fibers, natural fibers, and ceramic fibers.

8. An electric motor, comprising:
    a housing;
    an annular stator assembly interior to the housing, the annular stator assembly including a first and second stator, each stator including a number of annularly arranged stator sections having field windings and a PC board;
    a rotor assembly rotatably coupled within the housing, the rotor assembly including:
        a first rotor corresponding to the first stator and including a first interface surface extending from edge to edge of the first rotor; and
        a second rotor corresponding to the second stator and including a second interface surface corresponding to the first interface surface and extending from edge to edge of the second rotor, the first rotor positioned with the first interface surface directly opposite the second interface surface and with the first interface surface in direct physical contact with the second interface surface where the edges of the first and second rotors are aligned, the first and the second rotor each including an over-molded body of a thermoset material including non-electrically conducting fillers and annular magnets formed of a series of magnets with successive opposite polarities extending from the over-molded body;
    wherein the PC board is configured to acquire instantaneous rotational position of the corresponding rotor.

9. The electric motor of claim 8, where the first rotor and second rotor each include:
    an annular U-shaped back iron including a first wall parallel to a second wall;
    a first annular magnet coupled to an interior surface of the first wall; and
    a second annular magnet coupled to an interior surface of the second wall.

10. The electric motor of claim 9, where the annularly arranged stator sections are positioned between the first annular magnet and the second annular magnet and include a pole piece region that extends above the field windings some distance, the distance being at most one-half the height of the field windings.

11. The electric motor of claim 9, where the first annular magnet and the second annular magnet are arranged so that polarities on the first annular magnet align with opposite polarities on the second annular magnet.

12. The electric motor of claim 8, where the annular stator assembly is over-molded such that an over-mold material encapsulates the field windings, leaving the pole piece region exposed.

13. The electric motor of claim 8, where the housing includes:
   a second stator assembly configured like the first stator assembly; and
   a second rotor assembly configured like the first rotor assembly;
   wherein the second stator and rotor assemblies are oriented in a mirror image to the first stator and rotor assemblies.

14. The electric motor of claim 13, where the housing includes:
   a third stator assembly configured like the first stator assembly; and
   a third rotor assembly configured like the first rotor assembly;
   wherein the third stator and rotor assemblies are oriented in a mirror image to the second stator and rotor assemblies.

15. The electric motor of claim 8, where the non-electrically conducting fillers are selected from the group of fillers including organic materials, inorganic materials, clays, silicates, mica, talcs, asbestos, rubbers, fines, and paper.

16. The electric motor of claim 14, where the rotors of each rotor assembly are over-molded together.

17. A method, comprising:
   positioning a first stator in a mirror image relationship to a second stator;
   placing a first rotor in direct physical contact with a second rotor from edge to edge of the first rotor and the second rotor between the first stator and the second stator, where the edges of the first and second rotors are aligned;
   over-molding a portion of the first rotor to keep a surface of a first magnet and a second magnet exposed;
   over-molding a portion of the second rotor to keep a surface of a first magnet and a second magnet exposed; and
   over-molding the portions of the first rotor and the second rotor together,
   wherein the over-molded portions of the first and the second rotor are of a thermoset material including non-electrically conducting reinforcement materials.

18. The method of claim 17, including over-molding the portions of the first rotor and the second rotor such that the first magnets and the second magnets extend from the over-molded portions.

19. The method of claim 17, including forming alignment structures in a first interface surface of the first rotor and a second interface surface of the second rotor, where the alignment structures fit together to bring the first rotor and the second rotor in direct physical contact.

20. The method of claim 17, including providing a means for communicating instantaneous rotational rotor position to a PC board located on a corresponding stator.

* * * * *